United States Patent [19]

Conrad

[11] 4,121,612
[45] Oct. 24, 1978

[54] BRAKE MEANS FOR A CENTER PIVOT IRRIGATION SYSTEM

[76] Inventor: John D. Conrad, Box 328, Ogallala, Nebr. 69153

[21] Appl. No.: 787,949

[22] Filed: Apr. 15, 1977

[51] Int. Cl.² .............................................. B05B 3/00
[52] U.S. Cl. .................................. 137/344; 188/72.3; 239/177
[58] Field of Search .............. 137/344; 188/72.3, 72.7, 188/72.9; 239/177, 212, 213

[56] References Cited

U.S. PATENT DOCUMENTS

| | | | |
|---|---|---|---|
| 2,026,513 | 12/1935 | Trombetta | 188/171 |
| 3,952,768 | 4/1976 | Townsend | 137/344 |
| 3,952,952 | 4/1976 | Townsend | 137/344 X |

Primary Examiner—Gerald A. Michalsky
Attorney, Agent, or Firm—Zarley, McKee, Thomte, Voorhees & Sease

[57] ABSTRACT

A brake assembly for a center pivot irrigation system is provided which prevents the drive towers of the system from rolling out of alignment. The assembly includes a signalling system which is mounted on the drive tower and which is connected to a swivel joint on the irrigation pipe so that predetermined misalignment is sensed thereby. The signalling apparatus is connected to a brake assembly mounted on the drive tower. The brake assembly generally comprises a housing which is rigidly mounted on the drive tower and which has an output shaft rotatably mounted therein. The output shaft is connected to at least one of the drive wheels of the tower. A clutch disc is mounted on the output shaft for rotation therewith within the housing and is adapted to frictionally engage a wall of the housing whereby rotation of the output shaft will be prevented. A pressure plate assembly is mounted in the housing and normally urges the clutch disc into frictional engagement with the housing wall. An actuator arm assembly is movably mounted in the housing for urging the pressure plate assembly out of engagement with the clutch disc. The actuator arm assembly is moved by an actuator which is operatively connected to the signalling system whereby the clutch disc will be moved into frictional engagement with the housing wall when predetermined misalignment of the tower is sensed by the signalling system.

4 Claims, 6 Drawing Figures

BRAKE MEANS FOR A CENTER PIVOT IRRIGATION SYSTEM

BACKGROUND OF THE INVENTION

This invention relates to a brake means for a center pivot irrigation system and more particularly to an improved brake means which automatically brakes the forward movement of the tower if the tower should roll ahead or is blown ahead by wind.

Center pivot irrigation systems normally comprise an overhead irrigation pipe having a plurality of spaced-apart drive towers supporting the same for rotating the pipe around the center pivot. In air and water drive systems, a reciprocatable trojan bar is mounted on the drive tower and engages drive wheel lugs to rotate the wheels during the drive stroke of the trojan bar.

Many types of brake systems have been provided for center pivot irrigation systems but the systems are quite complicated and are expensive to manufacture and maintain.

Therefore, it is a principal object of the invention to provide an improved brake means for a center pivot irrigation system.

A still further object of the invention is to provide a brake means for a center pivot irrigation system which automatically brakes the forward movement of the drive tower should the drive tower roll ahead or be blown ahead by the wind.

A still further object of the invention is to provide an improved brake means for a center pivot irrigation system which is easily mounted on the drive tower.

A still further object of the invention is to provide a brake means for a center pivot irrigation system which is economical to manufacture, durable in use and refined in appearance.

SUMMARY OF THE INVENTION

A disc type brake apparatus is mounted on the drive tower and has an output shaft extending therefrom which is operatively connected to one of the drive wheels of the tower. The disc type brake is normally disengaged so that the tower will move in response to the drive mechanism associated therewith. If the tower should roll forward or be pushed forward by the wind or the like, the brake assembly is engaged to prevent the output shaft and the drive wheel from rotating until the tower is again in alignment.

DESCRIPTION OF THE PREFERRED EMBODIMENT

Figure 1:
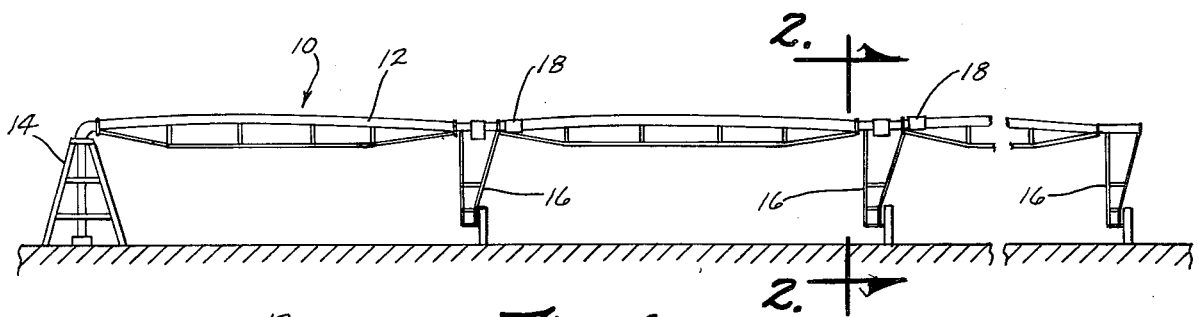
FIG. 1 is a partial side view of a conventional center pivot irrigation system having the brake means of this invention mounted thereon.
Figure 2:
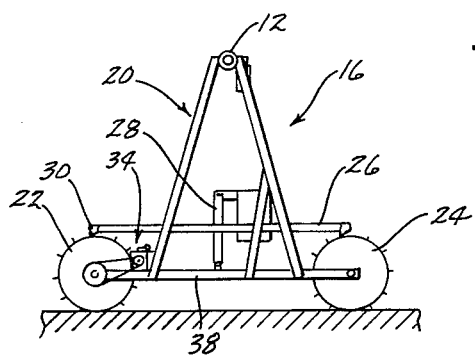
FIG. 2 is a sectional view seen on lines 2—2 of FIG. 1.
Figure 3:
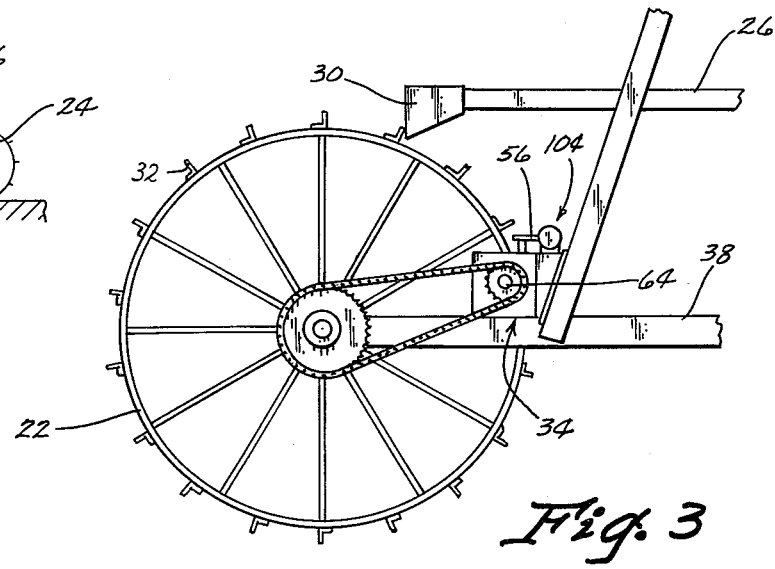
FIG. 3 is a partial side view of one of the drive towers having the brake means of this invention mounted thereon.

In FIG. 1, the numeral 10 refers generally to a conventional center pivot irrigation system generally comprising an overhead irrigation pipe 12 which extends outwardly from a center pivot 14 and which is supported by a plurality of drive towers 16. The conventional irrigation systems normally employ a swivel joint 18 imposed in the irrigation pipe adjacent each of the towers 16 to enable relative angulation between the towers. Each of the towers 16 generally comprise an A-frame means 20 having a pair of drive wheels 22 and 24 mounted thereon. In the conventional air, oil or water drive systems, a trojan bar 26 is reciprocatably mounted on the frame means 20 and is driven by a drive means 28 so that the dogs 30 at the outer ends of the trojan bar 26 engage the drive lugs 32 on the drive wheels to advance the wheels for each stroke of the drive means.

It is to this conventional irrigation system that the instant invention is combined.

The brake assembly of this invention is referred to generally by the reference numeral 34 and generally comprises a support or housing 36 which is bolted or otherwise secured to the main frame beam 38 or the like. For purposes of description, housing 36 will be described as including a top wall 40, bottom wall 42, side walls 44 and 46 and front wall 48. Collar 50 is welded to top wall 40 and extends upwardly therefrom and is in vertical alignment with collar 52 welded to bottom wall 42. Shaft 54 rotatably extends downwardly through collar 50, top wall 40 and is received by the collar 52. Actuator arm 56 is welded to the upper end of shaft 54 and extends laterally therefrom.

Collar 58 is welded to the exterior surface of wall 48 and extends horizontally therefrom. Sleeve bearing 60 is mounted in collar 58 and is maintained therein by means of set screw 62. Output shaft 64 is rotatably mounted in sleeve bearing 60 and extends inwardly through opening 66 formed in wall 48. The inner end of shaft 64 is rotatably mounted in a bearing 68 which is welded to the bearing support 70 connected to the housing 36 by bolts 72 and nuts 74.

Figure 5:
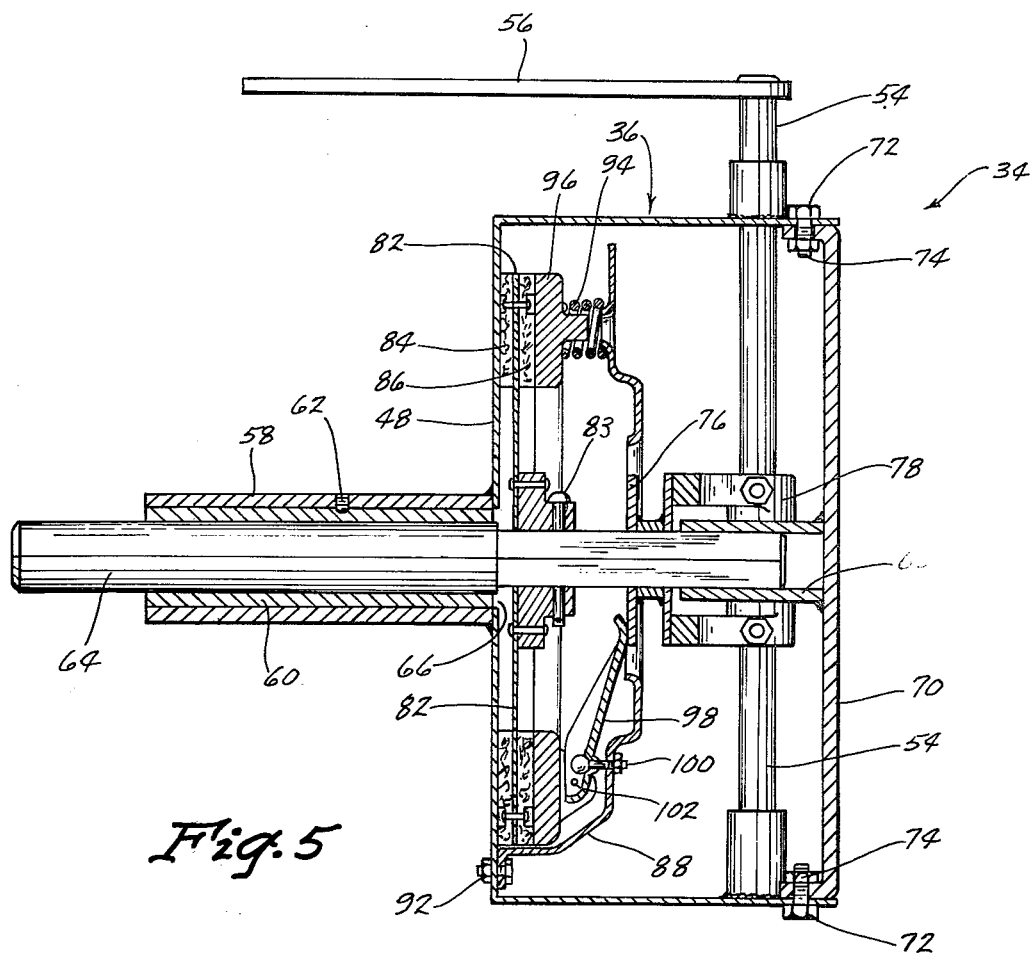
FIG. 5 is a sectional view of the brake assembly.
Figure 6:
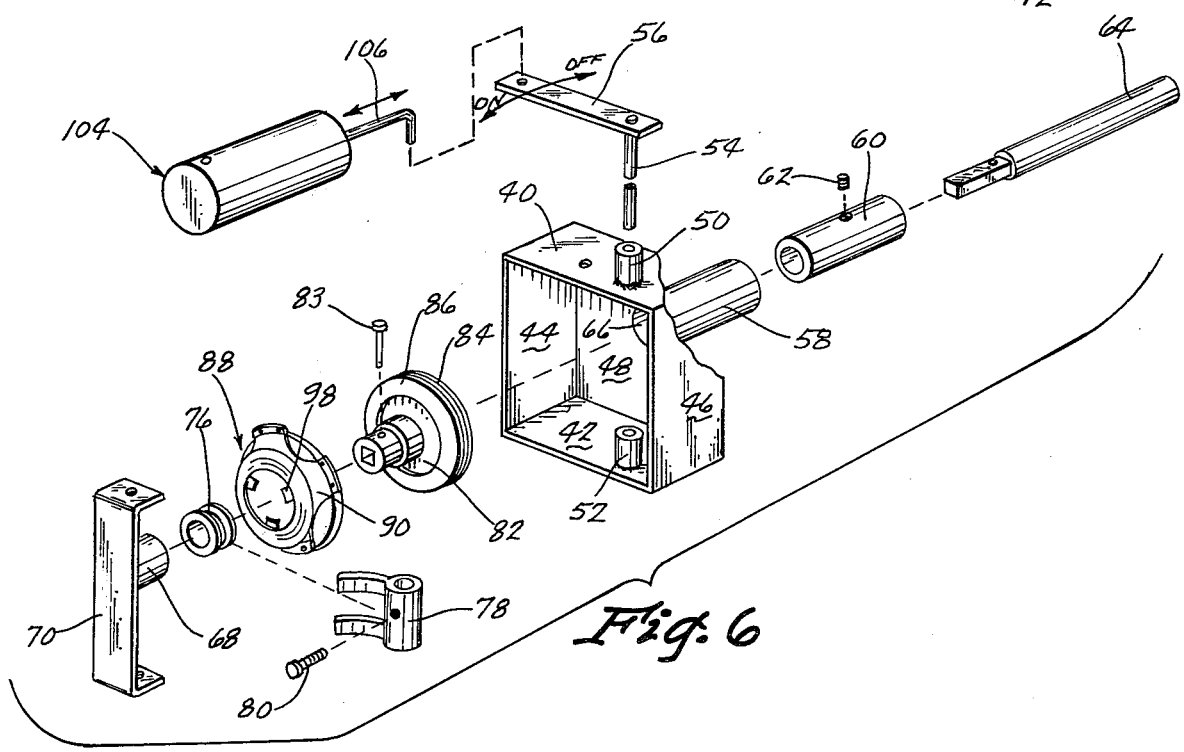
FIG. 6 is an exploded perspective view of the brake assembly.

The numeral 76 refers to a throwout which is rotatably and longitudinally movably mounted on shaft 64 within housing 36. Clutch fork 78 is mounted on the shaft 54 by means of bolts 80 and is adapted to engage the throwout 76 to move the throwout 76 to the left as viewed in FIG. 5 upon actuator arm 56 being rotated in a clockwise direction as viewed in FIG. 6. Clutch disc 82 is mounted on shaft 64 for rotation therewith by means of pin 83. As seen in FIG. 5, clutch disc 82 is provided with friction or brake lining surfaces 84 and 86 on the opposite sides thereof adjacent the periphery thereof. The numeral 88 refers to a automotive type pressure plate generally comprising a housing 90 which is bolted to the wall 48 by bolts 92. The pressure plate 88 is provided with a plurality of springs 94 which urge the clutch disc 82 into frictional engagement with the inner surface of wall 48. Pressure plate 88 also includes a plurality of return arms 98 which are pivotally mounted therein by means of bolts 100. The ends of the return arms 98 are pivotally connected to the pressure plate 96 at 102. As illustrated in FIG. 5, the inner ends of the return arms 98 are in engagement with the throwout 76 so that movement of the throwout to the left as viewed in FIG. 5 will cause the pivotal movement of the return arms 98 which causes pressure plate 96 to move to the right or out of frictional engagement with the clutch disc 82.

Figure 4:
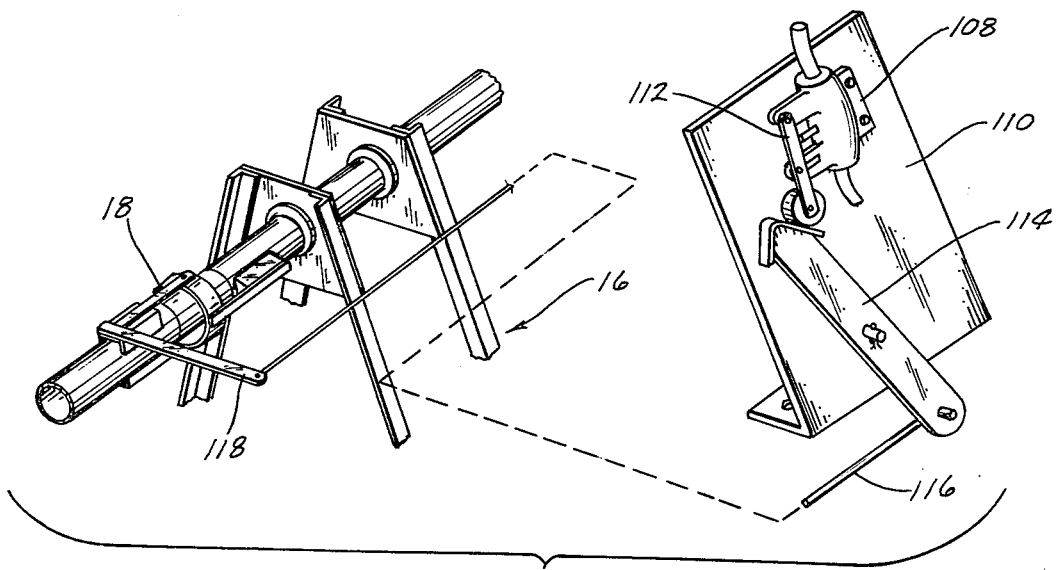
FIG. 4 is a partial perspective view illustrating a portion of the invention.

The numeral 104 refers generally to an actuator of the electrical, air or hydraulic type which is adapted to cause the longitudinal movement of the actuator rod 106 which extends from the actuator 104. Actuator 104 is operatively connected by any convenient means to a valve or switch 108 which is secured to a mounting plate 110 mounted on the frame of the tower. Valve 108 includes a valve actuator 112 mounted thereon which is adapted to be moved between open and closed positions by cam arm 114 pivotally mounted on the mounting plate 110 as illustrated in FIG. 4. The lower end of cam arm 114 has a tie rod 116 secured thereto which extends to the misalignment arm 118 which is secured to and which extends from the swivel joint 18 as illustrated in FIG. 4.

In normal operation, the actuator rod 106 will be in an extended condition so that throwout 76 is positioned to the left of that illustrated in FIG. 5 so that clutch disc 82 is not in frictional engagement with the inside surface of wall 48. Inasmuch as clutch disc 82 is not in frictional engagement with wall 48, the disc 82 is free to rotate and it will permit shaft 64 to rotate. If the associated tower should roll ahead a predetermined amount or be blown ahead by the wind a predetermined amount, misalignment arm 118 will cause cam arm 114 to pivot on plate 110 which will actuate the valve or switch 108. Actuation of the valve or switch 108 causes a signal to be supplied to the actuator 104 which will cause the actuator rod 106 to be withdrawn into the actuator 104 thereby causing actuator arm 56 to be rotated which in turn causes shaft 54 to be rotated. Rotation of shaft 54 causes throwout 76 to move towards support 70. Movement of the throwout 76 as described permits the springs 94 to urge plate 96 towards clutch disc 82 so that clutch disc 82 will be in frictional engagement with the inner surface of wall 48. Frictional engagement of the clutch disc 82 with wall 48 prevents rotation of the clutch disc 82 and therefor prevents rotation of the shaft 64. Inasmuch as shaft 64 cannot rotate, the drive wheel 22 cannot rotate thereby preventing further misalignment of the tower. The drive system on the tower continues to operate until the tower again comes into alignment. As soon as the tower comes into alignment, cam arm 114 will again pivot to the position of FIG. 4 so that valve or switch 108 is deactivated which causes the rod 106 to again be extended from the actuator 104 so that throwout 76 moves pressure plate 96 out of engagement with the clutch disc 82 to permit the tower to be moved by the drive apparatus.

Thus it can be seen that a novel brake means has been provided for a center pivot irrigation system which accomplishes at least all of its stated objectives.

I claim:

1. A brake means for a center pivot irrigation system having an overhead irrigation pipe extending outwardly from a central pivot, a plurality of spaced-apart drive towers supporting said pipe, said drive towers including tower wheels, at least one of said tower wheels being driven by one of air, water or oil drive system,
    a support means secured to at least one of said towers and having a brake surface provided thereon,
    an output shaft operatively rotatably mounted on said support means, means operatively connecting said output shaft to at least one of said tower wheels,
    a disc clutch means mounted on said output shaft for rotation therewith and adapted to be moved into frictional engagement with said brake surface,
    a pressure plate means connected to said support means for moving said clutch means into said frictional engagement, said pressure plate means normally urging said clutch means into frictional engagement with said brake surface,
    throwout means operatively connected to said pressure plate means to permit said clutch means to move out of frictional engagement with said brake surface whereby said output shaft may freely rotate,
    a control means operatively connected to one of said air, water or oil drive systems,
    said control means being operatively connected to said irrigation pipe adjacent said tower whereby predetermined forward misalignment of said tower caused by wind or terrain will cause said control means to be actuated,
    and actuator means operatively connected to said control means and said throwout means whereby actuation of said control means, by said misalignment, will cause said clutch means to engage said brake surface so that rotation of said output shaft is prevented to brake said one wheel.
2. The brake means of claim 1 wherein said throwout means comprises a throwout shaft rotatably mounted on said support means and having a fork means in operative engagement with said pressure plate means.
3. The brake means of claim 2 wherein said actuator means comprises a power cylinder operatively connected to said throwout shaft for rotating the same, an alighment sensing means operatively connected to said irrigation pipe at the drive tower, said control means being operatively connected to said power cylinder for operating the same, said control means being operatively connected to said alignment sensing means.
4. The brake means of claim 1 wherein said support means comprises a housing means, said brake surface comprising one of the walls of said housing means.

* * * * *